May 17, 1960 L. G. SIMJIAN 2,936,684
DEPOSITORY MACHINE COMBINED WITH CAMERA MEANS
Filed Nov. 1, 1957 8 Sheets-Sheet 1

INVENTOR.
LUTHER G. SIMJIAN
BY
AGENT.

May 17, 1960 L. G. SIMJIAN 2,936,684
DEPOSITORY MACHINE COMBINED WITH CAMERA MEANS
Filed Nov. 1, 1957 8 Sheets-Sheet 2

INVENTOR.
LUTHER G. SIMJIAN
BY
AGENT.

May 17, 1960 — L. G. SIMJIAN — 2,936,684
DEPOSITORY MACHINE COMBINED WITH CAMERA MEANS
Filed Nov. 1, 1957 — 8 Sheets-Sheet 3

INVENTOR.
LUTHER G. SIMJIAN
BY
AGENT.

May 17, 1960  L. G. SIMJIAN  2,936,684
DEPOSITORY MACHINE COMBINED WITH CAMERA MEANS
Filed Nov. 1, 1957  8 Sheets-Sheet 4

INVENTOR.
LUTHER G. SIMJIAN
BY
AGENT..

May 17, 1960

L. G. SIMJIAN 2,936,684

DEPOSITORY MACHINE COMBINED WITH CAMERA MEANS

Filed Nov. 1, 1957

INVENTOR.
LUTHER G. SIMJIAN
BY
Ervin B. Steinberg
AGENT.

May 17, 1960 L. G. SIMJIAN 2,936,684
DEPOSITORY MACHINE COMBINED WITH CAMERA MEANS
Filed Nov. 1, 1957 8 Sheets-Sheet 6

INVENTOR.
LUTHER G. SIMJIAN
BY Ervin B. Steinberg
AGENT.

May 17, 1960   L. G. SIMJIAN   2,936,684
DEPOSITORY MACHINE COMBINED WITH CAMERA MEANS
Filed Nov. 1, 1957   8 Sheets-Sheet 7

INVENTOR.
LUTHER G. SIMJIAN
BY
Ervin B. Steinberg
AGENT.

United States Patent Office 2,936,684
Patented May 17, 1960

2,936,684

DEPOSITORY MACHINE COMBINED WITH CAMERA MEANS

Luther G. Simjian, Greenwich, Conn.

Application November 1, 1957, Serial No. 693,986

22 Claims. (Cl. 95—1.1)

This invention relates to automatic machines for depositing an article of value and has particular reference to a machine which is adapted to accept checks or money and to issue a deposit slip in return for the deposit. Specifically, the machine is adapted to accept checks, paper money and coin money, to record an image of the article deposited and to return to the depositor a deposit receipt which is identifiable with respect to the article deposited as well as with respect to the recorded image of the article.

The increasing demand of the public for banking services and the requirement of banks to seek and attract more and new customers and capital have made it necessary for banks to establish branch offices away from the downtown area and open branch stations in suburban and outlying districts, thus making it more convenient for the public at large to take advantage of banking services. In spite of these efforts, there still exist many impediments since banking hours are restricted to certain hours of the day and banks generally are closed on many of the legal holidays, Saturdays, and Sundays. It is apparent, therefore, that contact with banks is subject to a rather restricted schedule.

Unquestionably, there exists a need for a machine which could perform certain functions of a bank teller particularly if such a machine would be operable during the hours and days when a bank is closed, or even for greater convenience, if such a machine would be installed in offices, plants, factories, waiting stations and other public places on a 24 hour a day basis. The instant invention describes such a machine, overcomes heretofore known shortcomings and provides a depository machine which is adapted for the deposit of checks, money, etc., thereby rendering an automatic banking service with utmost convenience to the customer. Further, the instant machine is adapted for payment of such plans as Christmas clubs, vacation clubs, savings plans, etc., which now must be paid by visits to the bank teller's window. Moreover, the instant machine may be used for the payment of bills in connection with payment of charges by public utilities, department stores, installment plans, etc., irrespective of whether the offices at which payment usually must be made are open or not.

In order to achieve the purpose intended, the depository machine is equipped with camera means to make a permanent record of the actual article deposited, provides an identification symbol, such as a transaction number and date stamp, in associated identifiable relationship with the record and returns to the depositor a deposit slip which is correlated with the deposit and record, and thus may be used as a record of the deposit made.

In its simplest embodiment, the depositor inserts the article to be deposited such as money into the machine. In one form of the invention the depositor also inserts a dual deposit slip into the machine. When starting the machine, the deposit slip is stamped with a date and transaction number and is moved together with the money deposited in a position for photography by a camera means disposed within the machine. After the exposure has been taken, the dual deposit slip is severed and the money and one portion of the deposit slip is moved to a receptacle within the machine, while the other portion of the deposit slip is returned to the depositor.

It will be apparent that when the machine is being emptied by a collecting service or by agents of the bank, store, or similar institution, there will be found in the receptacle within the machine a money deposit together with a transaction deposit slip. This deposit slip may carry a notation of the amount of money deposited by the depositor and if this amount coincides with the actual amount, the film exposure need not be developed. In the event of discrepancy, the film readily can be developed and questions of discrepancy are resolved in an easy manner. The machine is provided with means to separate the deposits of individual depositing transactions.

In another form of the invention a depositing slip is already contained within the machine and ejected to the depositor upon storage of the deposit while a duplicate deposit slip remains with the deposit.

In another form of the invention the machine is provided with internal counting means to add the individual paper bills and coin money and to stamp the receipt with the amount counted by the machine to give the depositor a receipt which carries additional information.

In yet another form of the invention the machine is provided with pass means in order to assure that only authorized persons use the machine.

One of the objects of this invention therefore is the provision of a depository machine combined with camera means adapted to accept paper money, coin money, checks and similar articles.

Another object of this invention is the provision of a depository machine which is useable for depositing money, for paying bills, for payment of installment payments, etc.

Another object of this invention is the provision of a depository machine which may be frequented by the public when payment offices are closed or when banking services are unavailable.

Another and further object of this machine is the provision of a depository apparatus which can be installed in offices, plants, factories, and many other public places for depositing money and for payment of bills.

Another and still further object of this invention is the provision of a depository machine which makes a record of the actual article deposited, makes a record of a transaction number in identifiable relationship with the record of the article and returns to the depositor a receipt which is adapted to identify a deposit made.

Another and further object of the invention is the provision of a depository machine which carries means to separate the individual deposits in order to readily identify the deposit of one depositor from the deposit of a succeeding depositor.

A still further object of this invention is the provision of a depository machine combined with camera means which is simple in its construction and readily useable by the public.

Another and still further object of the present invention is the provision of a depository machine which will aid materially in the payment of bills, in the depositing of money and which will bring certain types of banking services closer to the public.

Further and other objects of the present invention will become apparent from the following description taken in conjunction with the accompanying drawings in which.

Figure 1:
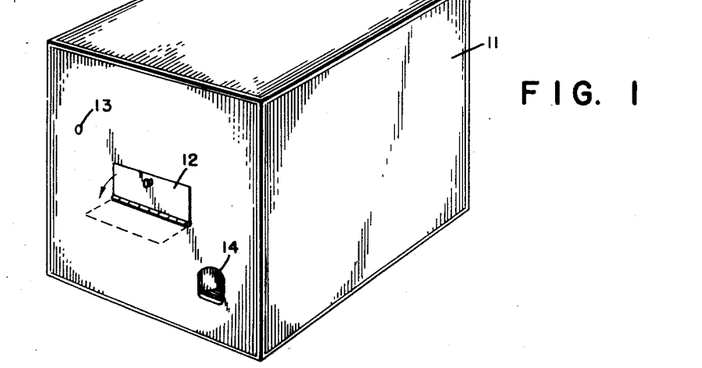
Figure 1 is a perspective view of the front panel and side of the depository machine.

Referring to the figures and Figure 1 in particular, a housing 11 contains substantially all of the necessary functional elements of the depositing machine. A person desiring to operate the machine will be required to open a hinged access cover 12 and slide out a tray normally concealed behind cover 12. After the article to be deposited has been put on the tray or slide, the slide is pushed in, cover 12 is closed, and a start push button 13 is depressed. The depositor in due course obtains a receipt of the deposit via chute 14. Either the slide or cover 12, or both, are provided with an interlock so that when the machine is in operation after depressing push button 13, the article deposited becomes inaccessible to the depositor. Conversely, provisions are made to prevent starting of the machine unless the slide is in its "in" position and cover 12 closed.

Figure 2:
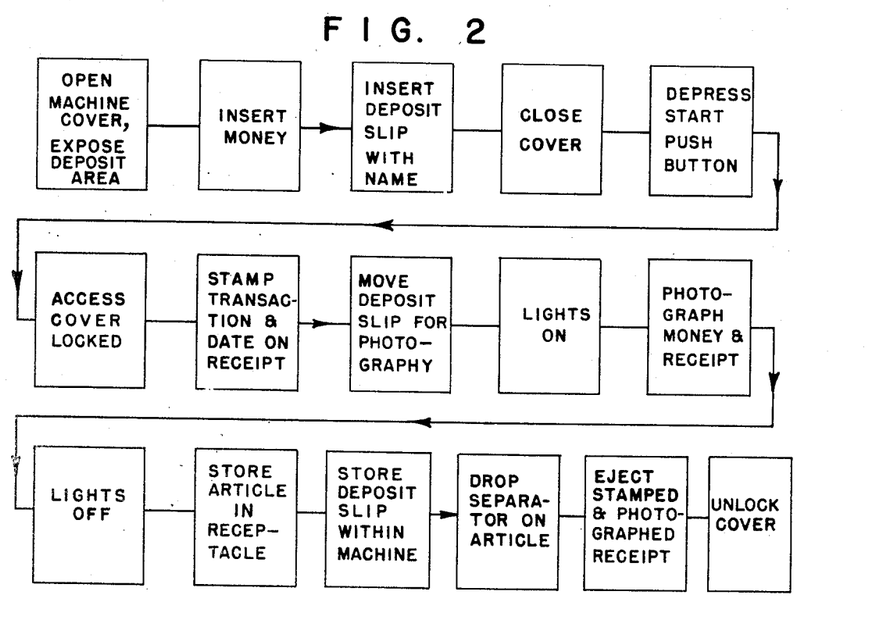
Figure 2 is a flow diagram in block form of the sequence and operations taking place when the machine is in operation.

The individual steps and the timing sequence for accomplishing the aims of the machine are presented schematically in block form in Figure 2. As a first step the depositor desiring to use the machine is required to open a cover or access door and expose a deposit area which is adapted to receive the article to be deposited, such as money. The depositor may be required to use special indentification or pass means which unlock the machine such as a pass key or a special plate with key means similar to charge account plates employed by many department stores and gasoline stations in order to render the machine operative. As a next step the depositor will insert his article, such as money, into the machine on a suitable tray or slide, etc. The depositor may also be requested to insert a deposit slip carrying his name and such other information as may be desired into the machine. In an alternate design and as a variation, a deposit slip may issue to the depositor from within the machine without the depositor being required to insert such a deposit slip. Next, the slide is pushed into the machine, the cover is closed and the start push button is depressed, the machine thus being started. Subsequently the access cover becomes locked so that the deposit can no longer be removed from the machine. Next, the deposit slip inserted into the machine or the deposit slip to be ejected from the machine is imprinted or stamped with a transaction number, a date and such other information as may be desirable. The deposit slip, after having been equipped with identifying means, is then moved into a position for photography. In an alternate design which will be discussed later, the deposit slip does not have to be photographed but other identifying means may be employed such as a counter or similar means. Following the diagram, it will be observed that, consecutively, lights become energized to illuminate the article deposited as well as the deposit slip, a photographic exposure is taken of the money and of the printed deposit slip, and the lights become de-energized. Next, the article or money is deposited into a receptacle disposed within the machine for storage, a portion of the deposit slip is stored with the article and a separator is placed on top of the money and of the deposit slip in order to separate the deposit just accomplished from a succeeding deposit. In the next step, a remaining portion of the deposit slip is returned to the depositor and finally the access cover becomes unlocked which completes the cycle for one depositing operation. It will be noted that in the typical and preferred embodiment described above, the article has been photographed in associated relationship with a deposit slip, secondly, that the article has been received in a receptacle together with a portion of the deposit slip to identify the article and the deposit with respect to one another, and thirdly, that a stamped receipt has been issued to the depositor to give the depositor a record of his deposit. The depositor thus holds a receipt which is correlated with respect to the photograph and with the deposit.

Under normal circumstances the film need not be developed since a deposit slip can be found with each deposit and a duplicate of the deposit slip is ejected to the depositor. However, in the event of discrepancy the film can readily be developed and since the image of the article is photographed in associated identifiable relationship with the image of the deposit slip, the deposit can readily be checked by scanning the film for the applicable identifying number, code or symbol appearing on the deposit slip.

Figure 3:
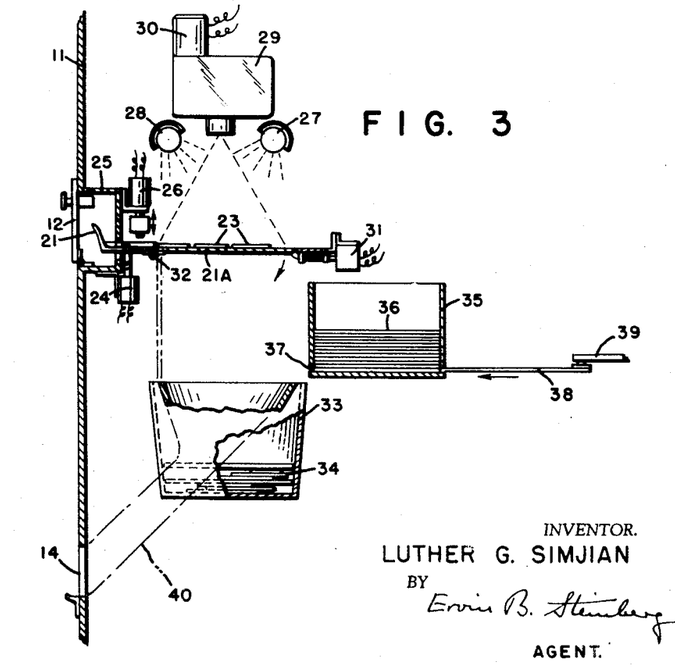
Figure 3 is a view in vertical section, partly schematic, of a typical embodiment of the machine, illustrating some of the active elements.

Figure 3 illustrates some of the elements employed in achieving the sequential steps described above. The access cover 12 conceals a tray or slide 21 which is adapted to support a plurality of articles 23 to be deposited within the machine. These articles which are money bills and a deposit slip are shown so positioned that photographing them will present proof as to the nature of the deposit. Thus, if a large number of bills is used, the bills may be placed in overlapping position as long as they are in such position as to be identified. The slide has a center panel 21A which is hingedly mounted in the slide 21 and upon which the articles 23 are placed. The slide with panel is extendable out of the machine for placing thereupon the money or article and must be pushed back into the machine before the access cover can be closed. When the machine is started, a solenoid plunger and latch combination 24 engages an aperture of the slide and retains the slide in its "in" position. A protective baffle 25 prevents the depositor from gaining access to the inside of the machine. A stamping device 26, electrically operated, is adapted to stamp a serial number, date, and other desirable information on the deposit slip. This device is suspended from the baffle and is actuated by a snap acting switch, commonly known as "microswitch," when the slide is pushed into the machine. Two illuminating lamps 27 and 28 are mounted above the slide to illuminate the article and the deposit slip for photography by camera 29, the shutter of which is solenoid operated (not shown) and which is equipped with a motor 30 for advancing the film. Cameras of this type are well known in the art. As soon as an exposure has been taken by camera 29, the article or money 23 is ready for storage within the machine. To this end, solenoid and latch combination 31 is energized which causes the panel 21A to pivot about hinge 32 thereby causing the articles or bills and deposit slip 23 to fall into a receptacle 33 which may contain prior deposits, for instance article 34 or a group of articles or bills. After the articles 23 have dropped into receptacle 33 it will be desirable to separate this new deposit from the next succeeding deposit which may be made by an entirely different depositor. For this purpose a container 35 is disposed to the side and slightly above receptacle 33. This container contains a plurality of flat separators such as cut sheets of cardboard 36, these sheets being dispensed via aperture 37 by a feeder slide 38 which is operated by a solenoid and plunger combination 39. During each forward stroke of plunger 39 in the direction of the arrow, feeder slide 38 advances and pushes a single separator out of aperture 37 and causes the separator to fall into receptacle 33. A portion of the deposit slip which has been severed by a knife (Figure 4) drops, when panel 21A is released, into chute 40 and is ejected to the depositor at chute terminal 14.

Figure 4:
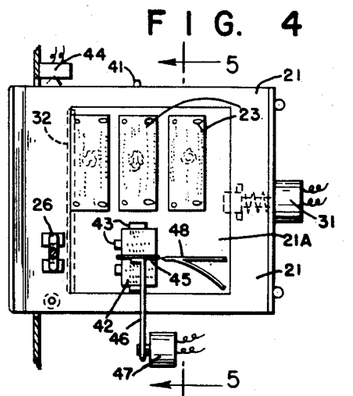
Figure 4 is a plan view, partly schematic, of the elements necessary to accept the articles to be deposited.

A plan view of this arrangement and the additional elements necessary are apparent in Figure 4 depicting for instance three paper bills 23 positioned on the panel 21A. A dual ticket 42 is shown disposed on the slide, and its location is indexed by means of several locating blocks 43. The dual ticket is illustrated more closely in Figure 6 which shows two ticket portions, one portion 42A remaining and being stored with the deposit and a lower portion 42B being returned to the depositor. Both ticket portions are stamped simultaneously, with a date and a transaction number for instance, and prior to placing the deposit slip on the slide the depositor may be requested to sign his name and address or account number on both portions of the ticket. It will be noted that in the present arrangement the money 23 as well as the ticket 42 are in view of the lens of the camera so that the deposit and the identifying deposit slip are photographed by the camera in associated identifiable relationship with respect to one another.

The printing device 26 is actuated by a convex embossing 41 attached to the slide 21. This embossing comes in contact with a stationary toggle switch 44 when the slide is moved in and out of the apparatus. Switch 44 is a momentary contact switch and causes energizing of the printing device 26 when the slide is moved into the machine, that is when a ticket has been placed on the slide by the depositor. This action causes the toggle of the switch to assume its actuated position and when the slide is withdrawn, i.e. when the slide is moved to its outward position, the toggle is caused to assume its cocked position thereby resetting the switch for momentary contact. Severing of the upper and lower deposit slip portions from one another is accomplished by a knife blade 45 attached via holder 46 to a rotary solenoid 47. Normally the knife is maintained in its raised position. Dropping of the hinged panel 21A about the axis of hinge 32 is accomplished by withdrawing the latch and plunger combination inserted in solenoid 31 upon energizing the solenoid.

Figure 5:
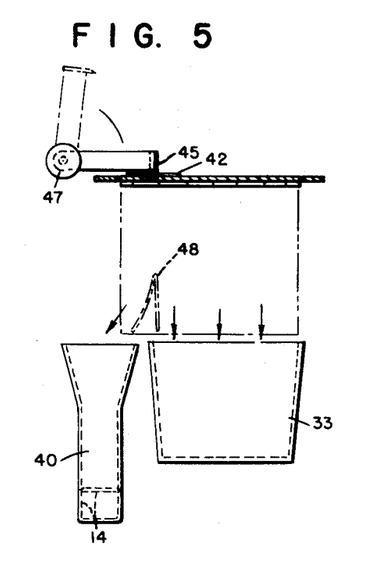
Figure 5 is a sectional view of Figure 4 along lines 5—5.

Figure 5 shows a cross-sectional view at line 5—5 of Figure 4 and illustrates the arrangement of the receptacle 33 relative to the chute 40 with guide means 48 adapted to separate the upper half of the deposit slip from the lower half for storage with the article deposited and causing the lower half of the slip to be returned to the depositor via chute 40. Rotary solenoid 47 which operates the knife 45 is depicted in its actuated and cutting position, cutting deposit slip 42.

Figure 7:
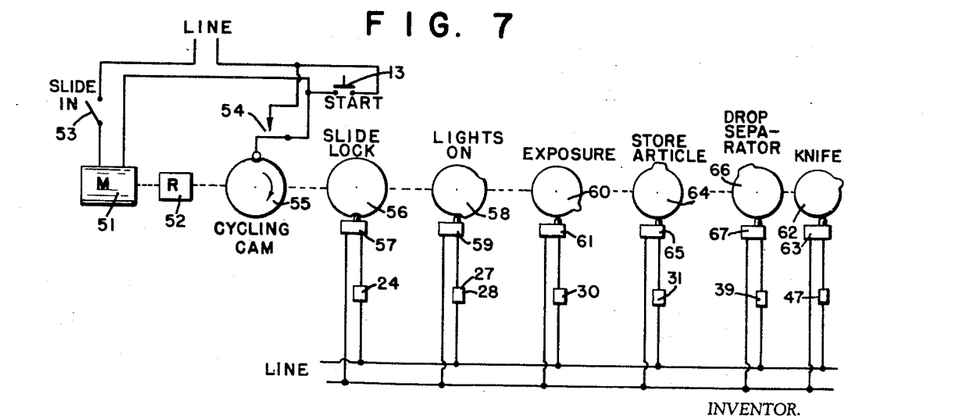
Figure 7 is a schematic electrical circuit diagram of the machine embodied in Figures 1 through 6.

Figure 7 shows the schematic circuit diagram for controlling the elements and the sequences to be accomplished. Motor 51 via gear reduction 52 drives a series of timing cams which control the various elements. In order to start motor 51, it is necessary that a slide sensing switch 53 (not shown in Figures 3 and 4) be in its closed position. This switch senses the slide in its "in" position and assures that the slide can be locked during operation of the machine. Upon momentary contact depressing of start button 13, motor 51 becomes energized and drives a series of timing cams.

Cam 55 operates a contact 54 and serves for the purpose of cycling the machine for one sequence. As soon as contact 54 is closed the circuit which includes the start push button is bypassed until the depression in cycling cam 55 opens contact 54. Immediately after motor 51 is started, cam 56 closes switch 57 to cause locking solenoid 24 to lock the slide or access cover. Cam 58 via switch 59 controls illumination lamps 27 and 28. Cam 60 via switch 61 energizes a solenoid operatively connected to the shutter of the camera (not shown) and causes the motor 30 of the camera to operate. Cam 62 via switch 63 controls the rotary solenoid 47 to sever the ticket. Cam 64 via switch 65 energizes solenoid 31 to release the panel 21A and finally cam 66 via switch 67 operates solenoid 39 for dropping a separator 36 from container 35 into the receptacle 33.

It will be apparent to those skilled in the art that the operations, timing and sequences may be adjusted and varied readily by moving the cams relative to one another and by adding or subtracting cams as the need arises.

Figure 6:
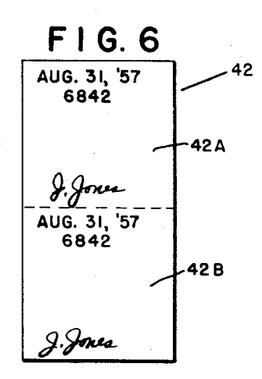
Figure 6 is a plan view illustrating a typical deposit slip and receipt.

As a variation of the foregoing apparatus the dual ticket shown in Figure 6 can readily comprise two individual deposit slips. One slip is inserted by the depositor with the article into the machine for storage, while the other slip is placed by the depositor in operative engagement with a validation or certification device which is exposed and accessible to the depositor. The validation device is actuated by the depository machine in response to photographic recording and/or storage of the article. After validation the depositor removes the validated slip from the device, the validated slip serving as his receipt.

Figures 8, 9, 10:
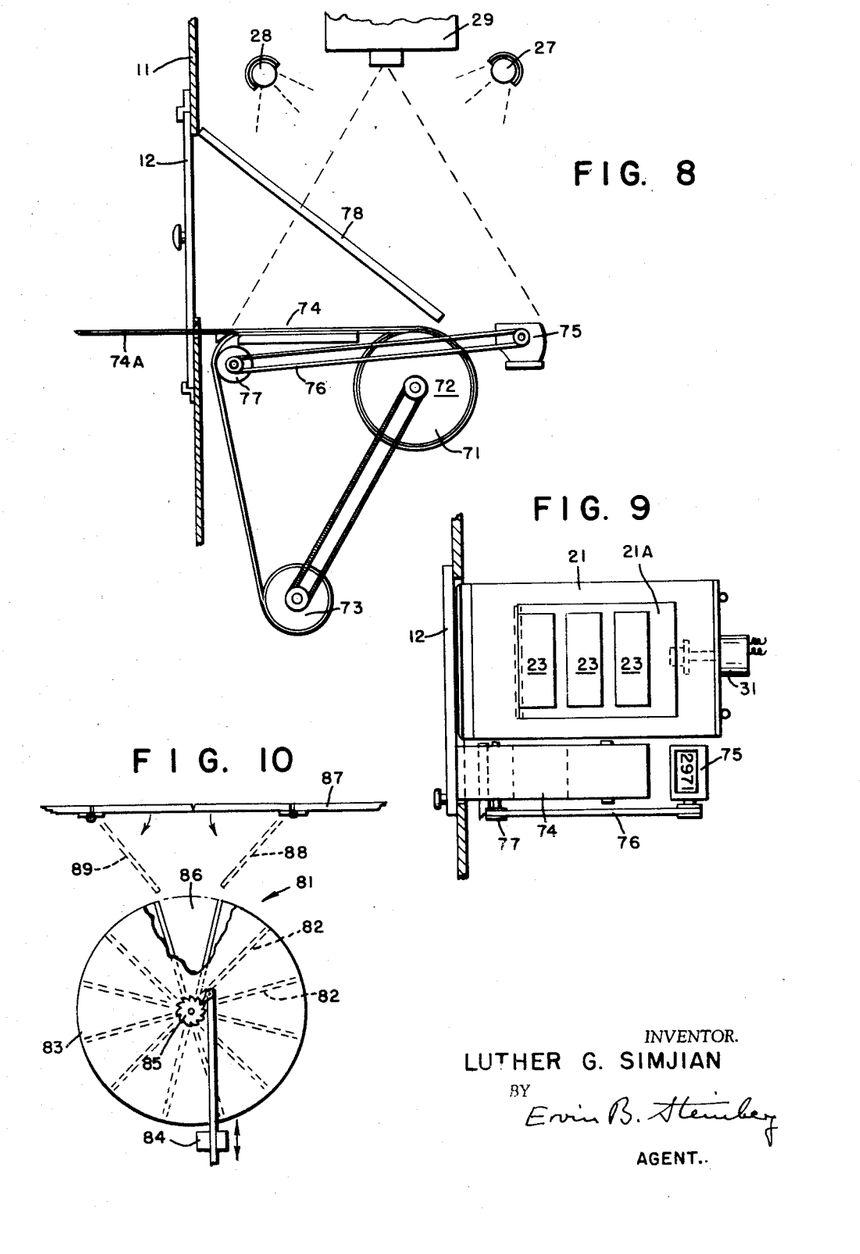
Figure 8 is a cross sectional view, partly schematic, of a variation of certain elements shown in Figure 3.
Figure 9 is a plan view, partly schematic, of Figure 8.
Figure 10 is a cross sectional view of an alternate receptacle design.

Figures 8 and 9 show a variation wherein the depositor is not required to insert a deposit slip into the machine but a receipt is issued from within the machine. Adjacent to the slide 21 there is mounted a motor operated autographic register, a machine which is commonly employed in connection with registering visitors in industrial plants, in offices, government establishments, etc.

These machines work on the principle that a visitor is requested to record his name and other pertinent data on a paper ticket. The paper is in duplicate and when advancing the paper out of the machine one copy remains in the machine while the other copy given to the visitor serves as a pass.

Such a register usually comprises a strip of paper 74 (Figures 8 and 9) unwinding from a roll of paper 71 disposed on a drum 72 and winding onto a roll 73. The depositor may be requested to sign his name onto the exposed portion of the paper 74 and the entire roll of paper may be preprinted at certain intervals with serialized numbers and be perforated in measured amounts, etc., as is well known in the art of these machines. Obviously, a serializing printing device may be employed to achieve the same result. A numerical counter 75 is driven via belt 76 from a measuring roller 77 and if the numbers appearing on counter 75 are adjusted and timed in such a manner that they can be correlated with the serialized numbers on the paper 74, there will be identifiable relationship therebetween. A baffle 78 which may be transparent glass pane is used to prevent a depositor from gaining unauthorized access to the internal elements of the machine.

When camera 29 takes an exposure of articles 23 disposed on slide 21 there will be taken also a photograph of the setting on counter 75 thereby obviating the need for photographing the ticket. The paper 74 may be arranged in duplicate by using an interleaved carbon paper. In this manner one copy of the paper may be wound on takeup drum 73 and a copy 74A is ejected to the depositor as his record. Paper portion 74A may be torn off by the depositor against a serrated edge at the cover of the machine. Still further, it will be apparent that instead of using takeup drum 73, the deposit slip to be retained in the machine may be cut by a knife and caused to be stored with or in associated relationship with the article deposited. By virtue of this instant modification there is issued to the depositor a record of the deposit, there is kept within the machine and in identifiable relationship with the article deposited a deposit identifying record, and further, there is obtained an identifying marking on the film which readily can be correlated with the record issued to the depositor.

Figure 10 shows a variation of the receptacle which is adapted to receive and store the article deposited. Primarily the receptacle is designed to incorporate deposit separators as a part of its design. To this end, cylindrical receptacle 81 is provided with a plurality of radially spaced separators 82. A circular stationary enclosure 83 encircles the receptacle except for a top opening thus creating an open ended pocket 86 of triangular cross section. The receptacle can be actuated by a solenoid 84 and ratchet mechanism 85 to cause sequentially bringing one pocket 86 after another into alignment with the opening of the stationary enclosure. The slide 87 is equipped with two aligned hinged panels 88 and 89 which separate at their inner edge. Upon release of these panels the article to be deposited will be guided into pocket 86 and when energizing solenoid 84, the pocket will be rotated and closed by means of the stationary enclosure 83 thus covering the articles deposited. In this manner the deposit of one depositor becomes separated from the deposit of another depositor without requiring separate dividing means to be inserted into the receptacle. It shall be noted further that the pockets may be numbered and that the sequence of numbers could readily be correlated with counter 75 of Figure 8, in which event storage of tickets with the deposits becomes unnecessary.

Figures 11, 12, 13, and 14 illustrate an alternate design which may be used in order to deposit and store the article and to issue a receipt which is totalized with respect to the amount of money deposited. A plurality of individual U-shaped pockets 91 are mounted consecutively on a link chain 92 which is driven by motor 93 over rollers 94, 95, and 96. Each pocket comprises essentially three portions 97, 98, and 99 disposed in a common plane. The front portion of each pocket 91 is lower than the rear portion of the pocket so that the top portion of a money bill 100 is exposed and may be photographed, thus obtaining an image of certain identifying characteristics of the bill. The pockets 91 are arranged with respect to one another in a semi-overlapping position so that the exposed portions of bills contained in adjacent pockets may readily be photographed. It will be observed further that the pockets 91 do not lie fully in one plane but that between portions 97 and 98 there is an area recessed to the rear and a similar recess between portions 98 and 99 in order to remove the money bill (which lies in the front plane) by means of a picker arrangement comprising a bifurcated picker arm 101 which has two fixed rear fingers 102 and 103 disposed between portions 97 and 98 and 98 and 99 respectively. As the pockets 91 pass the picker arm 101 the individual bills are removed from the associated pocket as the lower edge of each bill comes in contact with the horizontal surface 104 of the arm. The motion of the bills toward the rear is impeded by rear fingers 102 and 103 while any motion toward the front is restricted by a movable plate 105 which may be moved toward the rear fingers by means of electrically operated solenoid 106. In this manner money or paper bills can be removed consecutively from the individual pockets, collected standing on edge in picker arm 101 and retained between fingers 102, 103, front plate 105 and surface 104.

Figures 11, 12:
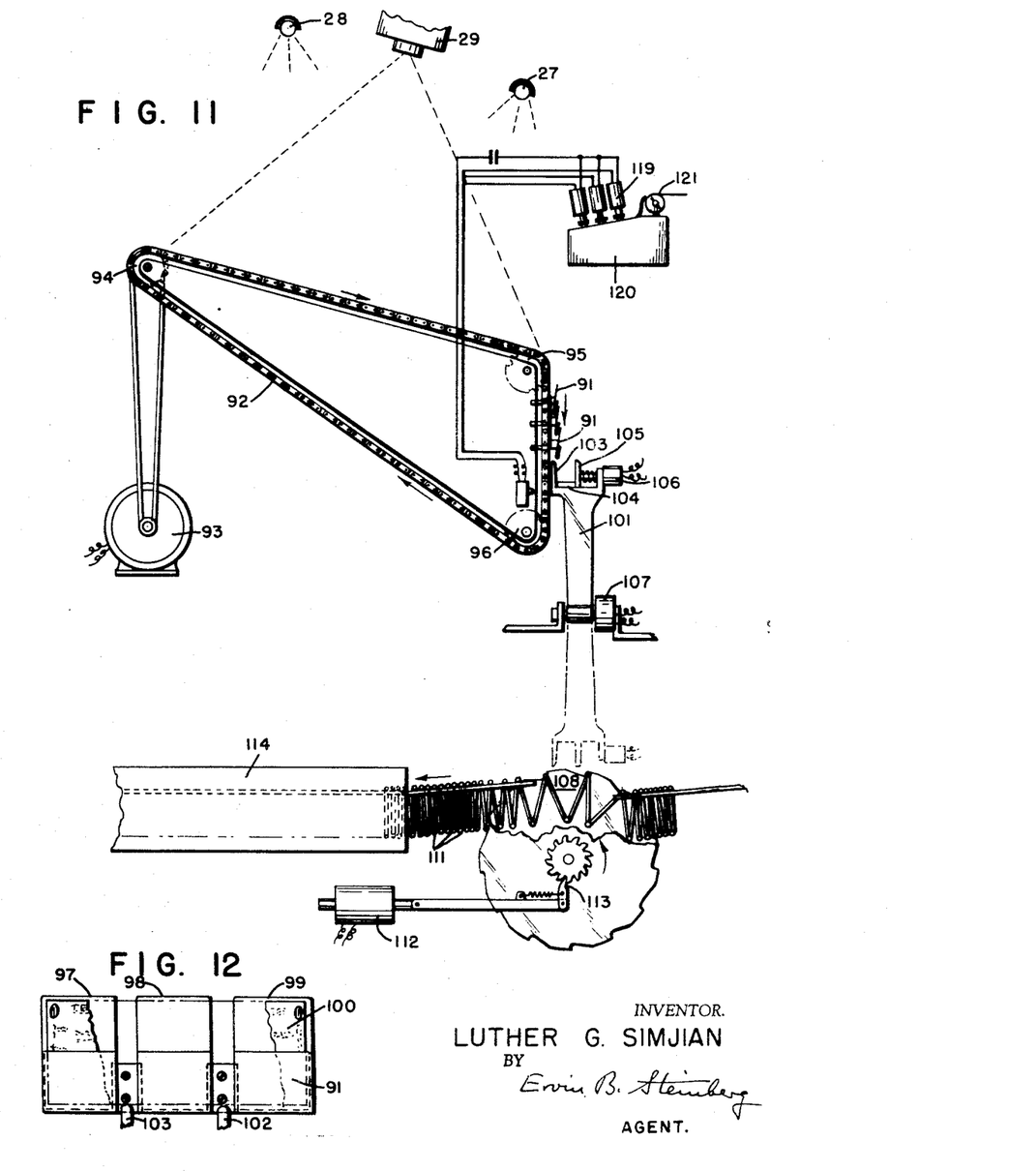
Figure 11 is a view in vertical section of an alternate storing and depositing mechanism.
Figure 12 is a plan view illustrating certain elements shown in Figure 11.

The money is deposited by the depositor, one bill to a pocket, when the individual pockets are in view of the camera 29 (Figure 11). It will be apparent that one pocket may be reserved for a serialized deposit slip or that a deposit slip may be stored within the machine and then photographed, or that a separate deposit slip may be used as will be shown later.

As soon as the bills have been photographed by camera 29, the pockets are moved clockwise (Figure 11) over roller 95 into the position depicted in Figure 11. As the individual pockets pass the picker arm 101, the deposited articles are removed from the pockets and come to rest in stacked fashion on horizontal surface 104. As a next step, solenoid 106 is energized to clamp and hold the deposit together. Subsequently, rotary solenoid 107 is energized causing picker arm 101 to rotate by 180 degrees and when de-energizing solenoid 106 the deposit drops into a receptacle pocket 108. The receptacle pockets 108 are formed by a plurality of plates 111 mounted to one another by hinges on their top and bottom edges so as to obtain a flexible structure similar to bellows. As the pockets pass the position opposite to the lowered picker arm the individual plates are spread apart to open a pocket. Subsequently, when energizing solenoid 112, a ratchet mechanism 113 causes the pocket just created to advance and to close by virtue of the next succeeding pocket being opened. In this manner the pocket filled previously is closed and pushed into protective receptacle enclosure 114. For collection and removal of the deposits, all pockets inserted or partially inserted are pushed fully into receptacle enclosure 114 and receptacle 114 removed from the machine. It will be apparent that in this manner the individual deposits again are separated from one another without requiring external or additional separating means.

Figure 13:
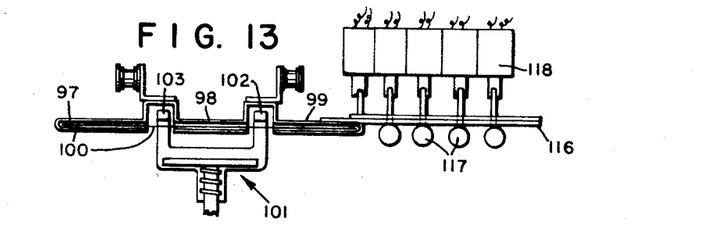
Figure 13 is a sectional view of certain elements used in conjunction with Figure 11, particularly an accounting and totalizing mechanism.
Figure 14:
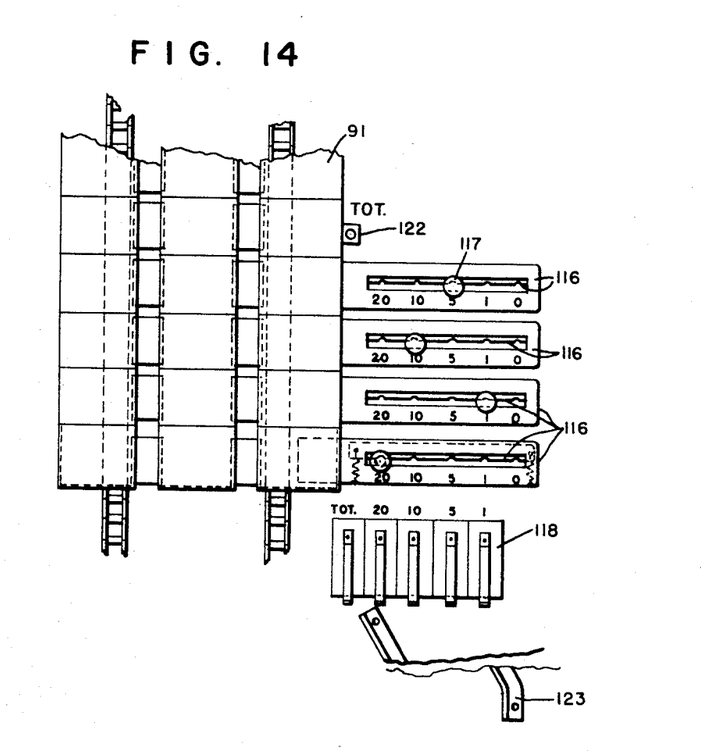
Figure 14 is a plan view for illustrating the operational features of the totalizing means.

Figures 11, 13, and 14 also illustrate a mechanism which may be used by the individual depositor to obtain a receipt which is totalized as to the amount of his deposit. Connected to each pocket 91 there will be found a setting mechanism to be manipulated by the depositor. This setting mechanism comprises two elongated bars 116 resiliently held to one another and notched at their separating surface to receive a pin 117. The notching positions represent certain denominations of money such as one, five, ten and twenty dollars and the associated pin when moved by the depositor into the respective notch position will be retained in the notch position until zeroized which operation will be explained later. Each pin therefore, is positioned to indicate the denomination of the bill in the associated pocket.

Referring to Figure 14 it will be observed that the top pin 117 is located in the "five" position, the second pin in the "ten" position, the third pin in the "one" position and the last pin in the "twenty" position whereby these positions indicate the denominations of the paper bill associated in the pocket. As the pockets 91 move in their downward path the setting mechanism comprising bars 116 and pins 117 moves in unison therewith. Stationary with respect to the pockets and setting mechanism there is disposed a plurality of microswitches 118, one switch for each denomination. Each switch is in alignment with a corresponding pin position. As pins 117 move over the respective microswitch in the array 118 and actuate a switch, a corresponding solenoid 119 is operated (Figure 11). These solenoids are disposed above a corresponding denomination key of a standard electric adding machine 120 to cause a printed record on paper tape 121. In this manner, as a denomination key is depressed the electric adding machine will print the individual amounts adjusted. Finally the totalizing tab 122 (Figure 14) passes over the corresponding switch disposed in array 118 and a solenoid mounted above the totalizer bar of the adding machine is depressed thus summing the entire deposit and zeroizing the machine in the well known manner.

It will be apparent that the ticket showing the totalized amount may be used by and ejected to the depositor or that the totalized amount may be retained in the machine and a duplicate or carbon copy issued to the depositor as desired. Further, the ticket showing the totalized amount may be additionally stamped with data such as date, transaction number, etc. prior to issuance and/or storage. As the pins 117 have passed over the microswitch array 118 there will be found stationary guide means 123 (Figure 14) which cause pins 117 to be returned automatically to their zero notch position by virtue of the bars 116 being resiliently held to one another, thus allowing the motion of the pins toward the right. It will be apparent that the totalizing means serve only as a convenience for the depositor to give him a record of the amount deposited. In the event that a mistake in the totalized amount is discovered or reported the film within camera 29 is developed and the image of the individual bills deposited will prove the denomination and quantities deposited. Identifying means on the film for correlation with the deposit may comprise any of the methods and arrangements described hereinbefore.

Figures 15, 16, 18:
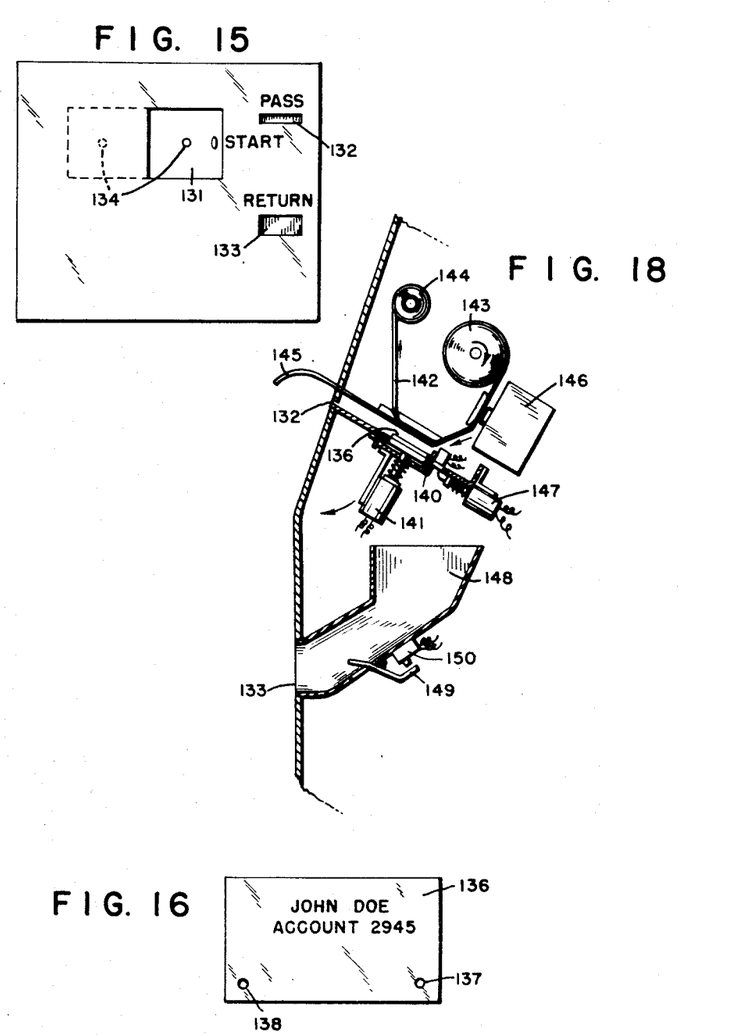
Figure 15 is a front view of the depository machine incorporating additional modifications.
Figure 16 is a plan view illustrating a typical pass plate means useable in conjunction with the machine.
Figure 18 is a view in vertical section showing the location and cooperation of certain elements used in conjunction with the pass plate means per Figures 16 and 17.

Figure 15 is a front view of the machine bearing certain modifications, particularly a machine which requires pass means for rendering the machine operative. Numeral 131 identifies a slidable access door which is shown in its closed position toward the right, and which must be opened by sliding it toward the left in order to accomplish a deposit. A slot 132 permits insertion of certain pass means which are necessary to unlock the access door 131. A return chute 133 serves for returning to the depositor, after the machine is in operation or has operated the pass means inserted into the slot 132. Numeral 134 shows a start button mounted on the door which serves to energize the apparatus. It will be observed that this button is located on the access door and since the door is concealed when located toward the left, the door must be in its closed position to render the start push button 134 operable by the depositor.

Figure 17:
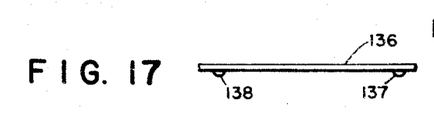
Figure 17 is a side view of Figure 16.

Figures 16 and 17 illustrate a typical pass means which may be employed although it should be clearly understood that other pass means including keys, etc. may be used in order to render the machine operable. These pass means are of value in order to prevent unauthorized use and also to assure that the deposits can be made only by regular customers or otherwise recognized persons. As a typical example, pass means 136 comprises a flat plate which has certain embossings giving the name of the pass holder, an account number and other data which are deemed to be pertinent. In addition thereto, the plate is equipped with two raised embossings 137 and 138; the distance between the embossings, the height and configuration may be used for coding purposes. It will be apparent that chute 132 may be equipped with indexing means so that only recognized pass plates can be inserted into the chute. In general the plate is similar to plates issued by department stores for charge account customers.

Figure 18 illustrates how this pass plate may be used for identification purposes within the machine after it has served to unlock the machine. Plate 136 is inserted through aperture 132 and comes to rest in operative position by means of a stop plate 140. A solenoid 141 is mounted underneath the position at which the identification plate comes to rest and is equipped at its front end with a plunger and a metal stamping means. When this plunger is raised by energizing solenoid 141 it will carry along with it the pass means and identification plate 136 and the raised portions in the plate can be used to make an imprint onto a paper 142 in the same manner as these plates are used in connection with charge accounts in stores, in gasoline service stations, etc. Paper 142 in tape form is unwound from a drum 143 and is wound onto drum 144. By using paper in duplicate one of the printed records can be kept within the depository machine and wound on drum 144 whereas a duplicate of the record slip 145 may be made available to the depositor. Additional printing means 146 may be employed to serialize and date the deposit record slip in the well known manner or numeral 146 may represent also the adding machine device previously discussed to totalize the deposit made. The advance of the paper and printing can be accomplished in the well known manner as used in electrically operated cash registers where a record of the deposit is kept within the machine and a duplicate record is issued to the customer. The strip of the deposit paper can be of suitable length and cash registers as used in supermarkets provide a good example of this device, showing individual and total amounts as well as other pertinent information.

After the record has been made and a ticket is ready to issue to the depositor, solenoid 147 is energized which trips a latch and permits the support for the pass means together with solenoid 141 to pivot clockwise in the direction of the arrow, thus dropping the pass means into the mouth 148 of the chute and returning the pass plate to the depositor at the terminal point 133. As the plate passes through the chute, it trips a lever 149 which in turn causes actuation of a switch 150. This switch 150 energizes a mechanism (not shown) which causes the tray like arrangement onto which the pass means is placed, the printing solenoid 141, etc. to be returned to the position shown in Figure 18, thus completing the sequence of operation.

It will be apparent that the timing of these sequences can readily be arranged with timing cams as shown in connection with Figure 7 and that the modification in Figures 15 through 18 is merely a modification of rendering the machine operative and identifying the person making a deposit by automatic and standardized means.

Figure 19:
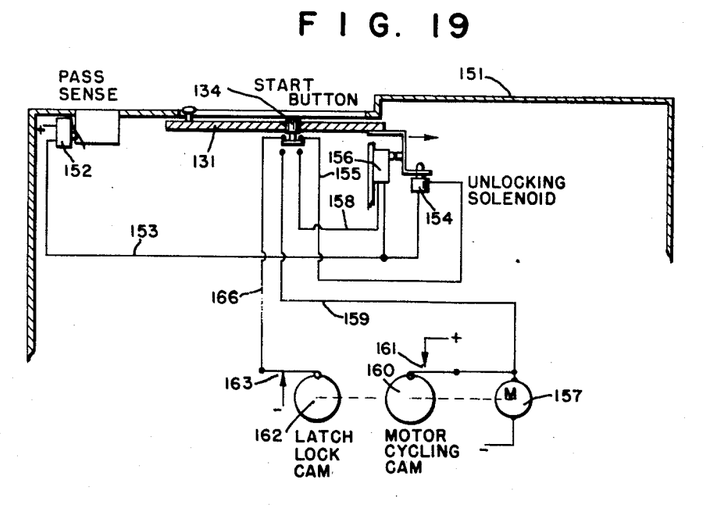
Figure 19 is a schematic electrical circuit diagram of the locking and unlocking arrangements for use in the machine when employing the pass means.

Figure 19 shows a schematic electrical circuit diagram of some of the interlocking features connected with the embodiment of the features described in Figures 15 through 18. The access door 131 is shown in its closed position. It will be observed that if the door is in its open position the start button being mounted to the door will disappear behind cover 151. Switch 152 senses the presence of pass means and is closed when pass means 136 (Figure 16) are inserted into the machine. As soon as this switch is tripped electrical circuit is established from the positive pole and switch 152 via conductor 153, unlocking solenoid 154, conductor 155, the upper set of switch contacts on start button 134, conductor 166 and switch contact 163 to the negative pole of the source of power. The energizing of solenoid 154 causes withdrawal of a plunger engaging a suitable aperture in the extension of door 131 thus permitting opening of the door and insertion of the deposit. After the deposit has been inserted the door is closed and full closing of the door is sensed by a limit switch 156 which causes a set of contacts to be closed when the door is fully closed. When depressing the start push button, motor 157 becomes energized as evidenced by following the circuit from the positive terminal at switch 152 via conductor 153, closed limit switch 156, conductor 158, the lower set of contacts on the start switch 134, conductor 159, motor 157 to the negative pole of the power supply. The start of the motor causes the motor cycling cam 160 to rotate and immediately circuit contact 161 becomes closed thus bypassing switches 152, 134, 156, etc., which become disabled for one complete cycle. In this condition it is required that unlocking solenoid 154 be disabled and the access door remain locked for the complete cycle. This requirement is met by cam 162 which, as soon as the motor rotates, opens a set of contacts, numeral 163, thereby breaking the circuit to unlocking solenoid 154, causing the latch to remain engaged in the corresponding aperture of door 131 extension.

It will be observed that in a manner similar to the circuit described before, the access door remains locked during the operation of the machine and that the deposit cannot be removed from the machine. At the same time pass means are employed in order to render the machine operative and to produce a printed record of the identity of the depositor.

It will be apparent that various other modifications may be made within the machine without departing from the principle and spirit of the present invention. Instead of a negative photographic film it is possible to substitute positive photographic paper to produce direct image prints. As a further alternate, electronic scanning may be used in conjunction with magnetic tape recording in the same manner as video information is being recorded on magnetic tape for delayed broadcast on commercial television stations. Furthermore, if the film is developed at all times, individual separation of the deposits within the receptacle may not be necessary since the separation between the film frames may be used to indicate succeeding deposits. In a similar manner the top or bottom location of a deposit slip with respect to the article or articles deposited may be used as an indication of the individual deposits. Moreover, a plurality of articles may be photographed sequentially instead of by a single exposure. This sequential method is particularly suited if automatic feeding means are employed to insert the articles into the machine. Such feeding mechanisms are well known in the art of sorting tabulating cards and in the art of feeding checks for photographic recording onto microfilm.

Whenever it is desired that the machine accept coin money it will be apparent that a coin counting apparatus can be incorporated without encountering any difficulties. This counting device can be geared to a numerical indicating device which shows the amount of coin deposit made. The well known "Mailomat" machine found in many of the U.S. Post Offices and available to the public to produce metered mail when the stamp dispensing window is closed incorporates such a mechanism. As money in different denominations is inserted into the counting device, a numerical counter adds the individual denominations and shows in a window the total amount of deposit made in coin money. The counter may readily be photographed and if desired, connected to an adding machine in order to provide a record of the coins inserted into the depositing machine. In a similar manner the counter may be connected to a printing device for printing a record on a deposit slip. In order to assure genuineness of the deposit slug rejectors may form an integral part of the mechanism. The counter is zeroized in the conventional manner.

In order to avoid printing means, photographic means may readily be substituted which produce either by virtue of split image means or by double camera means two separate photographic images. One image will be retained within the depository machine while the other image is available as a receipt to the depositor.

Moreover, in another variation, the receipt issued to the depositor may comprise a preprinted or partially preprinted ticket contained within the machine which is made available to the depositor only upon having made a deposit. In this manner the ticket will merely certify that a deposit was made.

Still further, a verification device may be disposed in operative engagement with the depository machine for the purpose of either verifying the genuineness of paper money or of sensing the denomination of the paper bills fed into the machine. It will be apparent that the output from this sensing means may be connected directly to the adding machine 120 (Figure 11) in order to automatically produce a totalized ticket, thus obviating any manual settings.

Finally it will be apparent in the event that there exist legal restrictions as to photography of certain articles in their entirety, such articles may be deposited in partial pockets, such as are shown in several of the aforesaid figures, or that the articles may be inserted into envelopes having cutouts to reveal only a few significant data. The envelopes may carry additional information as to the depositor's name, account number, etc. In a similar manner, optical masking means may be used to blank out portions of the article.

While there have been described and illustrated specific embodiments of the invention, it will be obvious that various further changes and modifications may be made therein without departing from the field of the invention which should be limited only by the scope of the appended claims.

What is claimed is:

1. In a depository machine which includes image recording means, receipt issuing and retaining means, and a storage receptacle which is disposed inaccessible to a depositor using the machine, the combination of: aperture means disposed on said machine for receiving a deposit; means adapted to guide the deposit from the aperture means to the storage receptacle; an indicia display; image recording means disposed to view said indicia display and viewing also the deposit as it is guided from the aperture means to the storage receptacle; means actuating said recording means in response to the receipt of said deposit to cause a recorded image of the deposit and of the indicia display in identifiable relationship with one another; means releasing an indicia bearing receipt from engagement with the machine and retaining inaccessible to the depositor, another indicia bearing receipt whose indicia are related to the released receipt, and the indicia on said receipts being related to the recorded indicia display to provide reference to said deposit and deposit image.

2. In a depository machine which includes image recording means, receipt issuing and retaining means, and a storage receptacle which is disposed inaccessible to a depositor using the machine, the combination of: aperture means disposed on said machine for receiving a deposit; means adapted to guide the deposit from the aperture means to the storage receptacle; an indicia display; image recording means disposed to view said indicia display and viewing also the deposit as it is guided from the aperture means to the storage receptacle; means actuating said recording means in response to the receipt of said deposit to cause a recorded image of the deposit and of the indicia display in identifiable relationship with one another; means releasing an indicia bearing receipt from engagement with the machine and retaining with the deposit in said receptacle another indicia bearing receipt whose indicia are related to the released receipt, and the indicia on said receipts being related to the recorded indicia display to provide reference to said deposit and deposit image.

3. In a depository machine which includes image recording means, receipt issuing and retaining means, and a storage receptacle disposed inaccessible to a depositor using the machine, the combination of: aperture means disposed on said machine for receiving a deposit; means adapted to guide the deposit from the aperture means to the storage receptacle; an indicia display; image recording means disposed to view said indicia display and viewing also the deposit as it is guided from the aperture means to the storage receptacle; means actuating said recording means in response to the receipt of said deposit to cause a recorded image of the deposit and of the indicia display in identifiable relationship with one another; means releasing an indicia bearing receipt from engagement with the machine and retaining inaccessible to the depositor another indicia bearing receipt whose indicia are related to the released receipt whereby the indicia on said receipts are related to the recorded indicia display to provide reference to said deposit and deposit image, and means disposed in said machine causing the deposit guided to the receptacle to be maintained separate from a succeeding deposit.

4. In a depository machine which includes image recording means, receipt issuing and retaining means, and a storage receptacle disposed inaccessible to a depositor using the machine, the combination of: aperture means disposed on said machine for receiving a deposit; means adapted to guide the deposit from the aperture means to the storage receptacle; an indicia display; image recording means disposed to view said indicia display and viewing also the deposit as it is guided from the aperture means to the storage receptacle; means actuating said recording means in response to the receipt of said deposit to cause a recorded image of the deposit and of the indicia display in identifiable relationship with one another; means releasing an indicia bearing receipt from engagement with the machine and retaining with the deposit in said receptacle another indicia bearing receipt whose indicia are related to the released receipt whereby the indicia on said receipts are related to the recorded indicia display to provide reference to said deposit and deposit image, and means disposed in said machine causing the deposit guided to the receptacle and the retained receipt to be maintained in the receptacle separate from a succeeding deposit.

5. In a depository machine which includes image recording means, receipt issuing and retaining means, and a storage receptacle disposed inaccessible to a depositor using the machine, the combination of: aperture means disposed on said machine for receiving a deposit which comprises a group of articles, each article within this group being disposed for display to image recording means; means adapted to guide the articles from the aperture means to the storage receptacle; an indicia display; image recording means disposed to view said indicia display and viewing also each of the displayed articles as the group is guided from the aperture means to the storage receptacle; means actuating said recording means in response to the receipt of said articles to cause a recorded image of the articles which form the deposit and of the indicia display in identifiable relationship with one another; means causing said articles subsequent to having been viewed by said recording means to become grouped in said receptacle to form a unitary deposit which is distinct from a succeeding group of articles; means releasing an indicia bearing receipt from engagement with the machine and retaining inaccessible to the depositor another indicia bearing receipt whose indicia are related to the released receipt, and the indicia on said receipts being related to the recorded indicia display to provide reference to the image of the group of articles.

6. In a depository machine which includes image recording means, receipt issuing and retaining means, and a storage receptacle disposed inaccessible to a depositor using the machine, the combination of: aperture means disposed on said machine for receiving a deposit which comprises a group of articles, each article within this group being disposed for display: means adapted to guide the articles from the aperture means to the storage receptacle; an indicia display; image recording means disposed to view said indicia display and viewing also each of the displayed articles as the group is guided from the aperture means to the storage receptacle; means actuating said recording means in response to the receipt of said articles to cause a recorded image of the articles which form the deposit and of the indicia display in identifiable relationship with one another; means causing said articles subsequent to having been viewed by said recording means to become grouped in said receptacle to form a unitary deposit which is distinct from a succeeding group of articles; means releasing an indicia bearing receipt from engagement with the machine and retaining with the deposit within the receptacle another indicia bearing receipt whose indicia are related to the released receipt, and the indicia on said receipts being related to the recorded indicia display to provide reference to the image of the group of articles.

7. In a depository machine which includes image recording means, a plurality of receipts bearing related indicia, and a storage receptacle which is disposed inaccessible to a depositor using the machine, the combination of: aperture means disposed on said machine for receiving a deposit; means adapted to guide the deposit from the aperture means to the storage receptacle; image recording means disposed to view the indicia on at least one of said receipts and viewing also the deposit as it is guided from the aperture means to the storage receptacle; means actuating said recording means in response to the receipt of said deposit to cause a recorded image of the deposit and of the indicia in identifiable relationship with one another, and means releasing one of the indicia bearing receipts from engagement with the machine and retaining another of the indicia bearing receipts inaccessible to the depositor.

8. In a depository machine which includes image recording means, a plurality of receipts bearing related indicia, and a storage receptacle which is disposed inaccessible to a depositor using the machine, the combination of: aperture means disposed on said machine for receiving a deposit; means adapted to guide the deposit from the aperture means to the storage receptacle; image recording means disposed to view the indicia on at least one of said receipts and viewing also the deposit as it is guided from the aperture means to the storage receptacle; means actuating said recording means in response to the receipt of the deposit to cause a recorded image of the deposit and of the indicia in identifiable relationship with one another, and means releasing one of the indicia bearing receipts from engagement with the machine and retaining another of the indicia bearing receipts with the deposit.

9. In a depository machine which includes image recording means, a plurality of receipts bearing related indicia, and a storage receptacle which is disposed inaccessible to a depositor using the machine, the combination of: aperture means disposed on said machine for receiving a deposit; means adapted to guide the deposit from the aperture means to the storage receptacle image recording means disposed to view the indicia on at least one of said receipts and viewing also the deposit as it is guided from the aperture means to the storage receptacle; means actuating said recording means in response to the receipt of the deposit to cause a recorded image of the deposit and of the indicia in identifiable relationship with one another; means releasing one of said indicia bearing receipts from engagement with the machine and retaining another of said indicia bearing receipts inaccessible to the depositor, and means disposed in said machine causing the deposit guided to the receptacle to be maintained separate from a succeeding deposit.

10. In a depository machine which includes image recording means, a plurality of receipts bearing related indicia, and a storage receptacle which is disposed inaccessible to a depositor using the machine, the combination of: aperture means disposed on said machine for receiving a deposit; means adapted to guide the deposit from the aperture means to the storage receptacle; image recording means disposed to view the indicia on at least one of said receipts and viewing also the deposit as it is guided from the aperture means to the storage receptacle; means actuating said recording means in response to the receipt of the deposit to cause a recorded image of the deposit and of said indicia in identifiable relationship with one another; means releasing one of said indicia bearing receipts from engagement with the machine and retaining another of said indicia bearing receipts with the deposit in said receptacle, and means disposed in said machine causing the deposit guided to the receptacle to be maintained separate from a succeeding deposit.

11. In a depository machine which includes image recording means, a plurality of receipts bearing related indicia, and a storage receptacle which is disposed inaccessible to a depositor using the machine, the combination of: aperture means disposed on said machine for receiving a deposit which comprises a group of articles, each article within this group being disposed for display; means adapted to guide the articles from the aperture means to the storage receptacle; image recording means disposed to view the indicia of at least one of said receipts and viewing also each of the displayed articles as the group is guided from the aperture means to the storage receptacle; means actuating said recording means in response to the receipt of the articles to cause a recorded image of the articles which form the deposit and of the indicia on said receipt in identifiable relationship with one another; means causing said articles subsequent to having been viewed by said recording means to become grouped in said receptacle to form a unitary deposit which is distinct from a succeeding group of articles; means releasing one of said indicia bearing receipts from engagement with the machine and retaining another of said indicia bearing receipts inaccessible to the depositor, and the indicia bearing receipts and the images of the articles within said group adapted to be correlated with respect to one another by said indicia.

12. In a depository machine of the type described and as set forth in claim 11 wherein the means retaining one of said indicia bearing receipts inaccessible to the depositor cause storage of said indicia bearing receipt with the deposit.

13. In a depository machine which includes image recording means, a plurality of receipts, and a storage receptacle which is disposed inaccessible to a depositor using the machine, the combination of: aperture means disposed on said machine for receiving from the depositor a deposit and a plurality of receipts; means disposed in the machine for affixing related indicia to the receipts; means adapted to guide the deposit from the aperture means to the storage receptacle; image recording means disposed to view the deposit and at least one of said receipts after indicia have been affixed thereupon; means actuating said image recording means in response to the receipt of the deposit and receipts to record an image of said deposit and of said indicia in identifiable relationship with one another; means releasing one of said indicia bearing receipts from engagement with the machine and retaining another of said indicia bearing receipts inaccessible to the depositor, and means maintaining the deposit guided to the storage receptacle separate from a succeeding deposit.

14. In a depository machine of the type described and as set forth in claim 13 wherein the indicia bearing receipt retained is disposed with the deposit in the storage receptacle separate from a succeeding deposit and its associated receipt.

15. In a depository machine which includes image recording means, a plurality of receipts, and a storage receptacle which is disposed inaccessible to a depositor using the machine, the combination of: aperture means disposed on said machine for receiving from said depositor a plurality of receipts and a deposit which comprises a group of articles, each article within this group being disposed for display; means disposed on said machine for affixing related indicia to said receipts; means adapted to guide the articles from the aperture means to the receptacle; image recording means disposed to view at least one of said receipts and also each of the displayed articles as the articles are guided from the aperture means to the storage receptacle; means actuating said recording means in response to the receipt of said articles and receipts to cause a recorded image of said articles and of the affixed indicia of said receipt in indentifiable relationship with one another; means causing said articles subsequent to having been viewed by said recording means to be grouped in said receptacle to form a unitary deposit which is distinct from a subsequent group of articles, and means releasing one of said indicia bearing receipts from engagement with the machine and retaining another receipt with the group of articles in the receptacle.

16. In a depository machine for use by a depositor, the combination of: aperture means adapted to receive from the depositor an article having an indentifying character; means operable for rendering the article inaccessible to the depositor and subsequently guiding it from said aperture means to a storage receptacle which is disposed in communication with the aperture means; image recording means disposed to view said article and adapted to record an image thereof; adjustable means settable to positions indicative of the character of the article; sensing and indicia recording means connected to one another and adapted to be operated responsive to the setting of said adjustable means for providing a record of the indicia which are indicative of the setting of said adjustable means as sensed by said sensing means, and control means cyclically operating said image recording and indicia recording means to produce a recorded image of the article and a record of said indicia respectively.

17. In a depository machine for use by a depositor, the combination of: aperture means adapted to receive from the depositor an article having an identifying character; means operable for rendering the article inaccessible to the depositor and subsequently guiding it from said aperture means to a storage receptacle which is in communication with the aperture means; image recording means disposed to view said article and record an image thereof; adjustable means settable to positions indicative of the character of the article; sensing and indicia recording means which include documentary record release means connected to one another and adapted to be operated responsive to the setting of said adjustable means; said indicia recording and release means adapted to provide a documentary record bearing indicia which are indicative of the setting of said adjustable means as sensed by said sensing means; control means for causing operation of said image recording means to produce a recorded image of the article and render the article inaccessible subsequent to an image thereof having been recorded, and control means actuating said indicia recording and release means for releasing the documentary record bearing the indicia when the deposited article has been rendered inaccessible to the depositor.

18. In a depository machine which includes image recording means, a plurality of receipts, and a storage receptacle which is disposed inaccessible to a depositor using the machine, the combination of: aperture means disposed on said machine for receiving from the depositor a deposit and a plurality of receipts; means disposed in the machine for affixing related indicia to the receipts; means adapted to guide the deposit from the aperture means to the storage receptacle; image recording means disposed to view the deposit and at least one of said receipts after indicia have been affixed thereupon; means actuating said image recording means in response to the receipt of the deposit and receipts to record an image of said deposit and of said indicia in identifiable relationship with one another, and means releasing one of said indicia bearing receipts from engagement with the machine and retaining another of said indicia bearing receipts inaccessible to the depositor.

19. In a depository machine for use by a depositor, the combination of: aperture means adapted to receive from the depositor an article having an identifying character; means operable for rendering the article inaccessible to the depositor after having been received at said aperture means and subsequently guiding it to a storage position which is disposed in communication with the aperture means; image recording means disposed to view said article and adapted to record an image thereof; adjustable means settable to positions indicative of the character of the article; indicia recording means adapted for coaction with said adjustable means for providing a record which bears indicia indicative of the setting of said adjustable means; control means for cyclically operating said image recording means to produce a recorded image of the article and for operating also said indicia recording means to produce said indicia bearing record, and means rendering the indicia bearing record available to the depositor to serve as a receipt for the article guided to the storage position.

20. In a depository machine for use by a depositor as set forth in claim 19 wherein totalizing means are connected to said indicia recording means to produce on said record indicia which are responsive to the totalized value of a plurality of settings of said adjustable means.

21. In a depository machine for use by a depositor, the combination of : aperture means adapted to receive from the depositor a deposit having an identifying value; means operable for rendering the deposit inaccessible to the depositor after having been received at said aperture means and subsequently guiding it to a storage position which is disposed in communication with the aperture means; image recording means disposed to view said deposit and adapted to record an image thereof; adjustable means settable to positions indicative of the value of the deposit; indicia recording means adapted for coaction with said adjustable means for providing a record which bears indicia indicative of the setting of said adjustable means; control means for cyclically operating said image recording means to produce a recorded image of the deposit and for operating also said indicia recording means to produce said indicia bearing record, and means rendering the indicia bearing record available to the depositor to serve as a receipt for the deposit guided to the storage position.

22. In a depository machine for use by a depositor, the combination of: aperture means adapted to receive from the depositor a deposit having an identifying value; means operable for rendering the deposit inaccessible to the depositor after having been received at said aperture means and subsequently guiding it to a storage position which is disposed in communication with the aperture means; image recording means disposed to view said deposit and adapted to record an image thereof; adjustable means settable to positions indicative of the value of the deposit; indicia recording means adapted for coaction with said adjustable means for providing a record which bears indicia indicative of the setting of said adjustable means; control means for cyclically operating said image recording means to produce a recorded image of the deposit and for operating also said indicia recording means to produce said indicia bearing record; means rendering the indicia bearing record available to the depositor to serve as a receipt for the deposit guided to the storage position; and means for zeroizing said adjustable means subsequent to recording the positions thereof.

References Cited in the file of this patent

UNITED STATES PATENTS

| | | |
|---|---|---|
| 494,050 | Anderson | Mar. 21, 1893 |
| 841,976 | Jackson | Jan. 22, 1907 |
| 1,919,957 | Lyman | July 25, 1933 |
| 1,949,283 | Murtaugh | Feb. 27, 1934 |
| 2,210,472 | Strotman | Aug. 6, 1940 |
| 2,211,847 | Bryce | Aug. 20, 1940 |
| 2,276,111 | Spears | Mar. 10, 1942 |
| 2,393,462 | Gorad | Jan. 22, 1946 |
| 2,411,694 | Place | Nov. 26, 1946 |
| 2,796,812 | Koci | June 25, 1957 |